United States Patent
Koenig et al.

(10) Patent No.: US 10,135,383 B2
(45) Date of Patent: Nov. 20, 2018

(54) CURRENT SENSING IN ELECTRIC MACHINES

(71) Applicant: Hamilton Sundstrand Corporation, Charlotte, NC (US)

(72) Inventors: Andreas C. Koenig, Rockford, IL (US); Joseph K. Coldwate, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/449,743

(22) Filed: Mar. 3, 2017

(65) Prior Publication Data

US 2018/0254735 A1    Sep. 6, 2018

(51) Int. Cl.
*H02K 11/27* (2016.01)
*H02P 29/40* (2016.01)
*H02P 27/06* (2006.01)

(52) U.S. Cl.
CPC ............ *H02P 29/40* (2016.02); *H02P 27/06* (2013.01)

(58) Field of Classification Search
CPC ...... H02P 1/00; H02P 3/00; H02P 6/00; H02P 27/04; H02P 27/06; H02P 21/00; H02P 41/00; H02H 7/08; H02H 7/09
USPC ............ 318/400.01, 400.02, 400.14, 400.15, 318/400.21, 400.22, 400.26, 400.27, 318/400.28, 700, 701, 727, 799, 800, 801, 318/490; 363/40, 44, 95, 120, 175; 361/30, 31, 47, 91.1, 93.9
See application file for complete search history.

(56) References Cited

U.S. PATENT DOCUMENTS

| | | | |
|---|---|---|---|
| 5,243,268 A * | 9/1993 | Klatt | H02P 25/024 318/732 |
| 5,705,909 A * | 1/1998 | Rajashekara | B60L 11/1803 318/801 |
| 5,907,244 A | 5/1999 | Crabill et al. | |
| 7,545,163 B2 | 6/2009 | Disser | |
| 8,810,189 B2 * | 8/2014 | Singh | G01R 31/42 318/400.21 |
| 9,448,271 B2 * | 9/2016 | Yan | G01R 31/024 |
| 2008/0265819 A1 | 10/2008 | Chen et al. | |
| 2011/0298310 A1 * | 12/2011 | Ross | H02K 41/06 310/20 |
| 2016/0134181 A1 * | 5/2016 | Maruyama | F04B 35/045 417/416 |

(Continued)

FOREIGN PATENT DOCUMENTS

| | | |
|---|---|---|
| CA | 2071397 A1 | 3/1993 |
| EP | 2665170 A1 | 11/2013 |
| JP | S5678389 A | 6/1981 |

OTHER PUBLICATIONS

Extended European Search Report dated Jun. 20, 2018 issued during the prosecution of European Patent Application No. EP 18159826.9 (7 pages.).

*Primary Examiner* — Antony M Paul
(74) *Attorney, Agent, or Firm* — Locke Lord LLP; Scott D. Wofsy; Christopher J. Cillié

(57) ABSTRACT

An electric machine includes a phase lead and a winding set with first and second windings. The first and second windings are connected to the phase lead and are connected electrically in parallel with one another. A current sensor is coupled to the first winding and is arranged to measure a portion of current flowing through the phase lead which flows through the first winding.

18 Claims, 6 Drawing Sheets

(56) References Cited

U.S. PATENT DOCUMENTS

2016/0204727 A1* 7/2016 Fujii ................. H02P 21/22
318/400.02

\* cited by examiner

CURRENT SENSING IN ELECTRIC MACHINES

BACKGROUND OF THE INVENTION

1. Field of the Invention

The present disclosure relates to electric machine, and more particularly monitoring current flow in winding sets for electric machine.

2. Description of Related Art

Electric motors, such as in aircraft, are commonly used to convert electrical power into mechanical power to operate various devices on aircraft. For example, 'more electric' aircraft architectures increasingly employ growing numbers of alternating current (AC) power motors to operable devices traditionally powered hydraulically, reducing weight and simplifying the arrangement of the aircraft. Such AC power motors typically employ three-phase windings, which are provided AC power by the aircraft electrical system, and may operate at high frequency in cooperation with a motor controller.

In some application it can be desirable to employ two or more winding sets for each AC phase in the electric motor. The winding sets are generally connected in parallel with one another to reduce winding resistance and inductance to limit electrical losses and to improve operation of the electric motor at high electrical frequencies. The parallel winding sets are typically fed by a common phase lead, which connects the parallel phase leads to the AC power bus source lead through a motor controller. Current flow through the winding sets is generally measured at the phase lead and provided to the motor controller for monitoring current flow through the winding sets for each phase of the motor.

Such conventional methods and systems have generally been considered satisfactory for their intended purpose. However, there is still a need in the art for improved current sensing in electric motors. The present disclosure provides a solution for this need.

SUMMARY OF THE INVENTION

An electric machine includes a phase lead and a winding set with first and second windings. The first and second windings are connected to the phase lead and are connected electrically in parallel with one another. A current sensor is coupled to the first winding and is arranged to measure a portion of current flowing through the phase lead which flows through the first winding.

In certain embodiments, the electric machine can be a motor. The electric machine can be a generator. The current sensor can be a first current sensor and the current sensing arrangement can include a second current sensor. The second current sensor can be coupled to the second winding. The second current sensor can be coupled to the phase lead. A motor controller can be disposed in communication with the current sensor for monitoring current flow through the first and second windings. An inverter can be electrically connected to the phase lead. The motor controller can be operably connected to the inverter.

In accordance with certain embodiments, the phase lead can be an A-phase lead. The winding set can be an A-phase winding set. The electric machine can include a B-phase lead. A B-phase winding set with first and second B-phase windings can be connected to the B-phase lead. A first B-phase current sensor can be coupled to the first B-phase winding. The B-phase current sensor can be arranged to measure a portion of current flowing through the B-phase phase lead which flows through the first B-phase winding. The motor arrangement can include a second B-phase sensor. It is contemplated that the second B-phase sensor can be coupled to the B-phase lead or to the second B-phase winding.

It is also contemplated that, in accordance with certain embodiments, the electric machine can include a C-phase lead. A C-phase winding set with first and second C-phase windings can be connected to the C-phase lead. A first C-phase current sensor can be coupled to the first C-phase winding. The C-phase current sensor can be arranged to measure a portion of current flowing through the C-phase phase lead which flows through the first C-phase winding. The motor arrangement can include a second C-phase sensor. The second C-phase sensor can be coupled to the C-phase lead or to the second C-phase winding.

A method monitoring current flow in an electric machine includes flowing current through first and second parallel windings in a winding set and sensing current flow through the first winding. Current flow can be sensed through the second winding. Health of the electric machine can be determined by comparing current flow through the first winding with current flow through the second winding. In certain embodiments, sensing current flow through the first and second winding includes sensing current flow at both the first winding and the second winding. In accordance with certain embodiments, sensing current flow through the first and second windings can include sensing current flow through the first winding and the phase lead.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
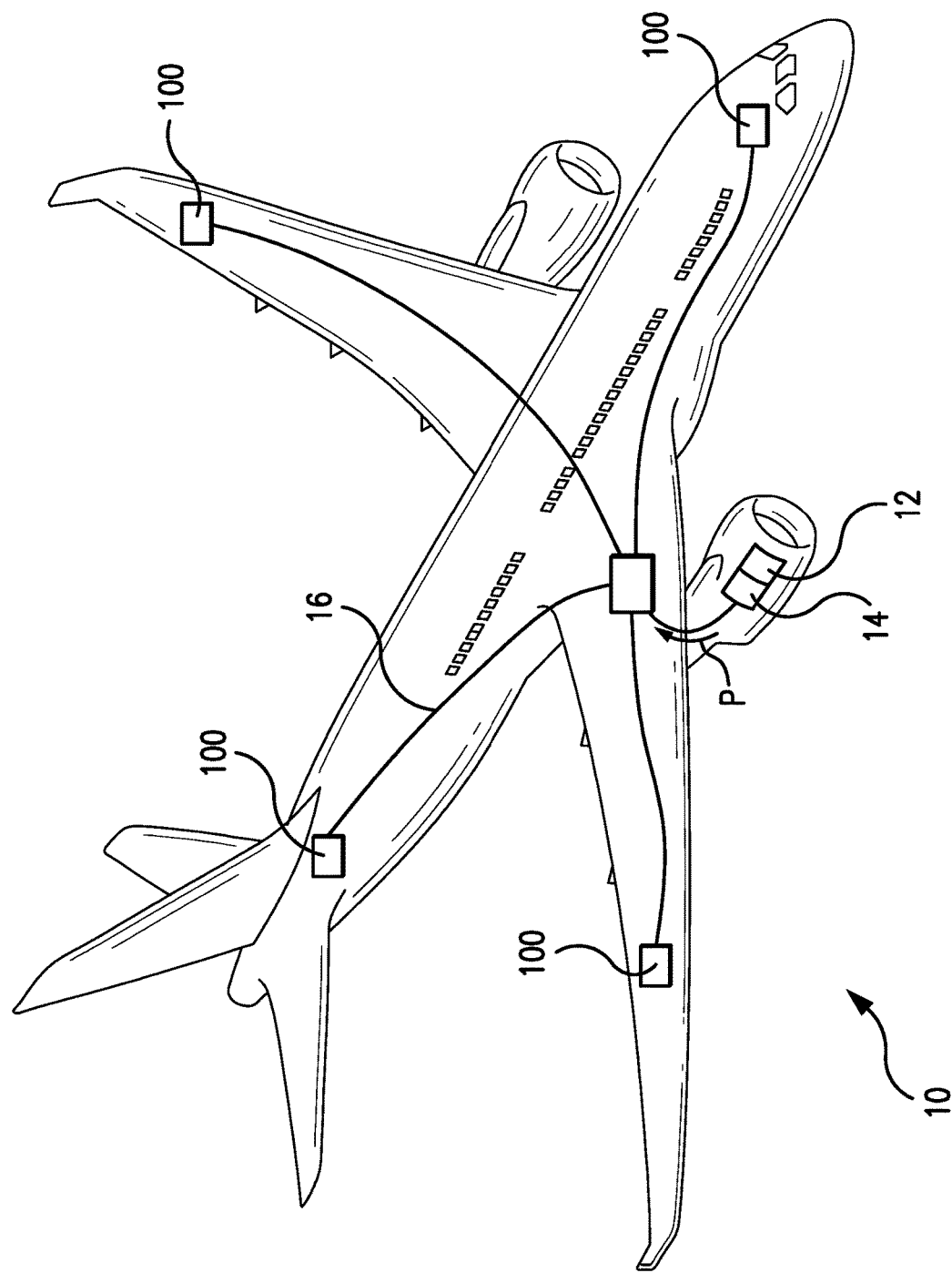
FIG. 1 is a schematic view of an exemplary embodiment of an electric machine constructed in accordance with the present disclosure, showing an aircraft power distribution system in communication with the electric machine.

Reference will now be made to the drawings wherein like reference numerals identify similar structural features or aspects of the subject disclosure. For purposes of explanation and illustration, and not limitation, a partial view of an exemplary embodiment of an electric machine in accordance with the disclosure is shown in FIG. 1 and is designated generally by reference character 100. Other embodiments of electric machine and methods of monitoring current flow within winding sets in accordance with the disclosure, or aspects thereof, are provided in FIGS. 2-6, as will be described. The systems and methods described herein can be used sensing current flow through parallel winding sets in electric machine in aircraft, though the present disclosure is not limited to aircraft or to electric machines with parallel windings.

Referring to FIG. 1, an aircraft 10 is shown. Aircraft 10 includes an engine 12, a generator electric machine 14, a power distribution system 16, and a motor 100, e.g., a motor electric machine. Engine 12 is operably connected to generator electric machine 14. Generator electric machine 14 is arranged to generate electrical power P using mechanical power received from engine 12. The power is provided to power distribution system 16, which connects generator electric machine 14 to motor 100 and provides the electrical power P thereto. While a current sensing arrangement for motor 100 is described herein in the following exemplary embodiments, it is to be understood and appreciated the described current sensing arrangement can also be applied to a generator electric machine, e.g., generator electric machine 14.

Figure 2:
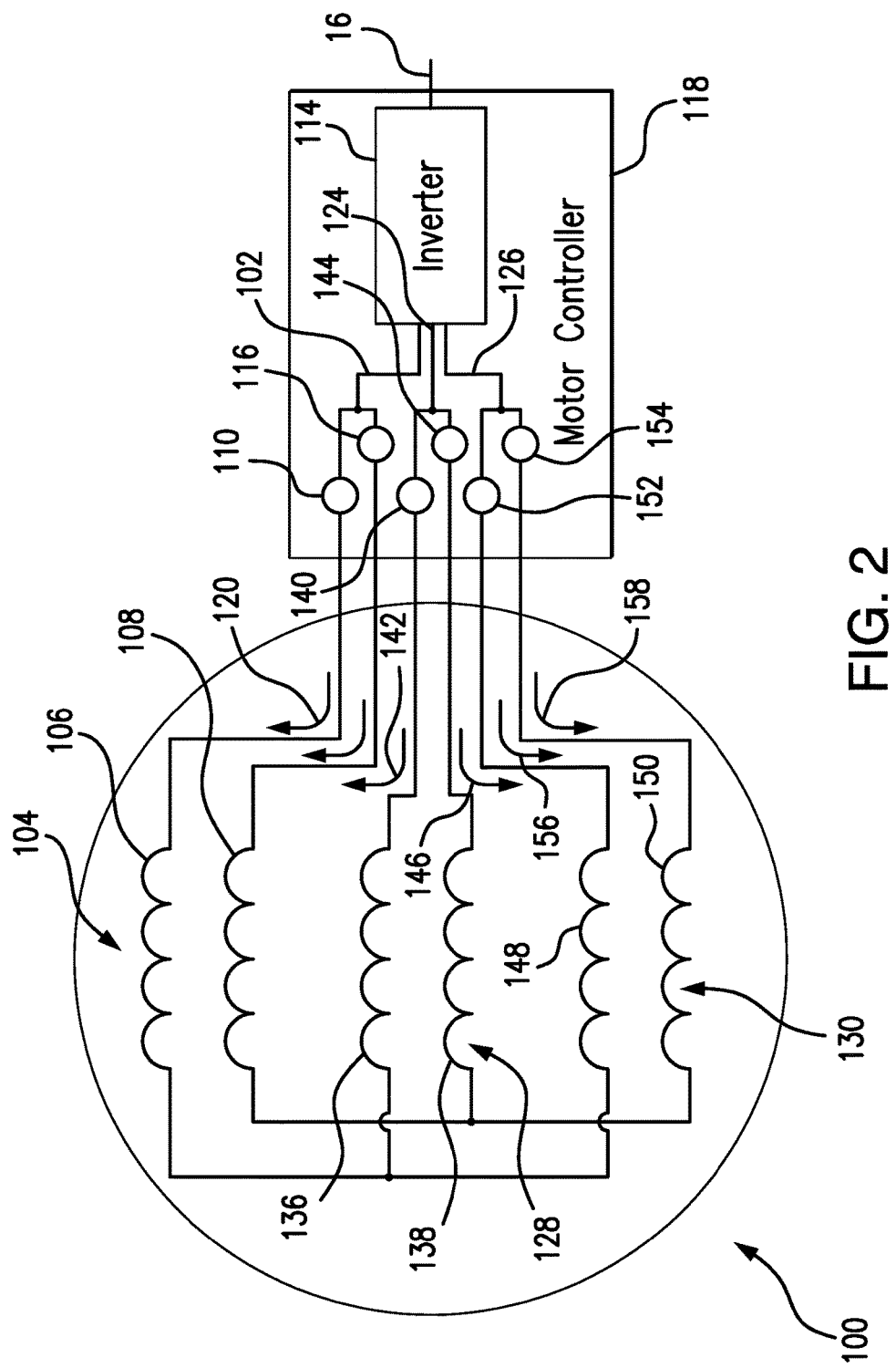
FIG. 2 is a schematic view of an embodiment of the electric machine of FIG. 1, showing current sensors coupled to winding sets of the electric machine within an motor controller.

With reference to FIG. 2, motor 100 is shown. Motor 100 includes a phase lead 102 and a winding set 104. Winding set 104 has a first winding 106 and a second winding 108 that are each connected to phase lead 102. Second winding 108 is connected electrically in parallel with first winding 106. A current sensor 110 is coupled to first winding 106 and is arranged to measure a portion of current flowing through phase lead 102 flowing through first winding 106.

In the illustrated exemplary embodiment phase lead 102 is an A-phase lead and winding set 104 is an A-phase winding set. A-phase lead 102 is connected to an inverter 114, which is arranged to provide AC power to A-phase lead 102. A-phase winding set 104 includes A-phase first winding 106, A-phase second winding 108, A-phase first current sensor 110, and an A-phase second current sensor 116. A-phase first current sensor 110 and A-phase second current sensor 116 are communicative with motor controller 118, A-phase first current sensor 110 being coupled to A-phase first winding 106 to provide A-phase a first winding current signal 112 to motor controller 118 and A-phase second current sensor 116 being coupled to A-phase second winding 108 to provide an A-phase second winding current signal 120 to motor controller 118.

As will be appreciated by those of skill in the art in view of the present disclosure, current flow between parallel phase windings in some types of motors can become unbalanced, compromising the health of the electric machine. For example, resistance changes such as due to a short or open in one of the parallel windings can cause current flow through one of the parallel windings to be greater than current flow through the other, leading to current flow imbalance between the parallel leads. Since current flow at the phase lead can remain unchanged notwithstanding the imbalance, current measurement at the phase lead can be slow to recognize or miss entirely the imbalance, potentially allowing the current imbalance to stress the winding disproportionately burdened by the current imbalance.

To recognize compromise of the health of electric machines, e.g., motor 100, motor 100 includes parallel windings which extend out of motor 100 and into motor controller 118, wherein the couple to a truncated phase lead. This allows for placement of current sensors directly on the parallel phase leads, where they can directly measure current flow through the parallel windings instead of relying on inferential measurements obtained from the phase lead.

Motor controller 118 is operably connected to inverter 114 and arranged to control power, i.e., current flow, applied to A-phase lead 102 according to at least in part based on current balance within A-phase winding set 104. For example, motor controller 118 can determine current flow through A-phase first winding 106 based on A-phase first winding current signal 112, determine current flow through A-phase second winding 108 based on an A-phase second winding current signal 120, and compare current flow through A-phase second winding 108 with current flow through A-phase first winding 106. Based on the comparison motor controller 118 can change the power applied to A-phase lead 102. For example, motor controller 118 can reduce the power applied to A-phase winding set 104 when the balance between current flow through A-phase first winding 106 and A-phase second winding 108 is outside of predetermined balance range, or level. Notably, the winding set can extend into motor controller 118 such that each current sensor can be housed within the motor controller, six windings entering motor controller 118 for current measurement and connection to phase leads, which terminate within motor controller 118.

As also shown in the illustrated exemplary embodiment, motor 100 is a three-phase AC power motor with parallel winding sets. In this respect motor 100 also includes a B-phase lead 124, C-phase lead 126, a B-phase winding set 128, and a C-phase winding set 130. B-phase lead 124 and C-phase lead 126 are connected to inverter 114, B-phase lead 124 receiving B-phase AC power from inverter 114 and C-phase lead 126 receiving C-phase AC power from inverter 114.

B-phase winding set 128 includes a B-phase first winding 136, a B-phase second winding 138, a B-phase first current sensor 140, and a B-phase second current sensor 142. B-phase second winding 138 is connected in parallel with B-phase first winding 136. B-phase first current sensor 140 is coupled to B-phase first winding 136 and is communicative with motor controller 118 for providing a B-phase first winding current signal inductive of current 141 flowing therethrough to motor controller 118. B-phase second current sensor 144 is coupled to B-phase second winding 138 and is communicative with motor controller 118 for providing a signal indicative of current flowing through B-phase second winding 138 to motor controller 118.

Figure 3:
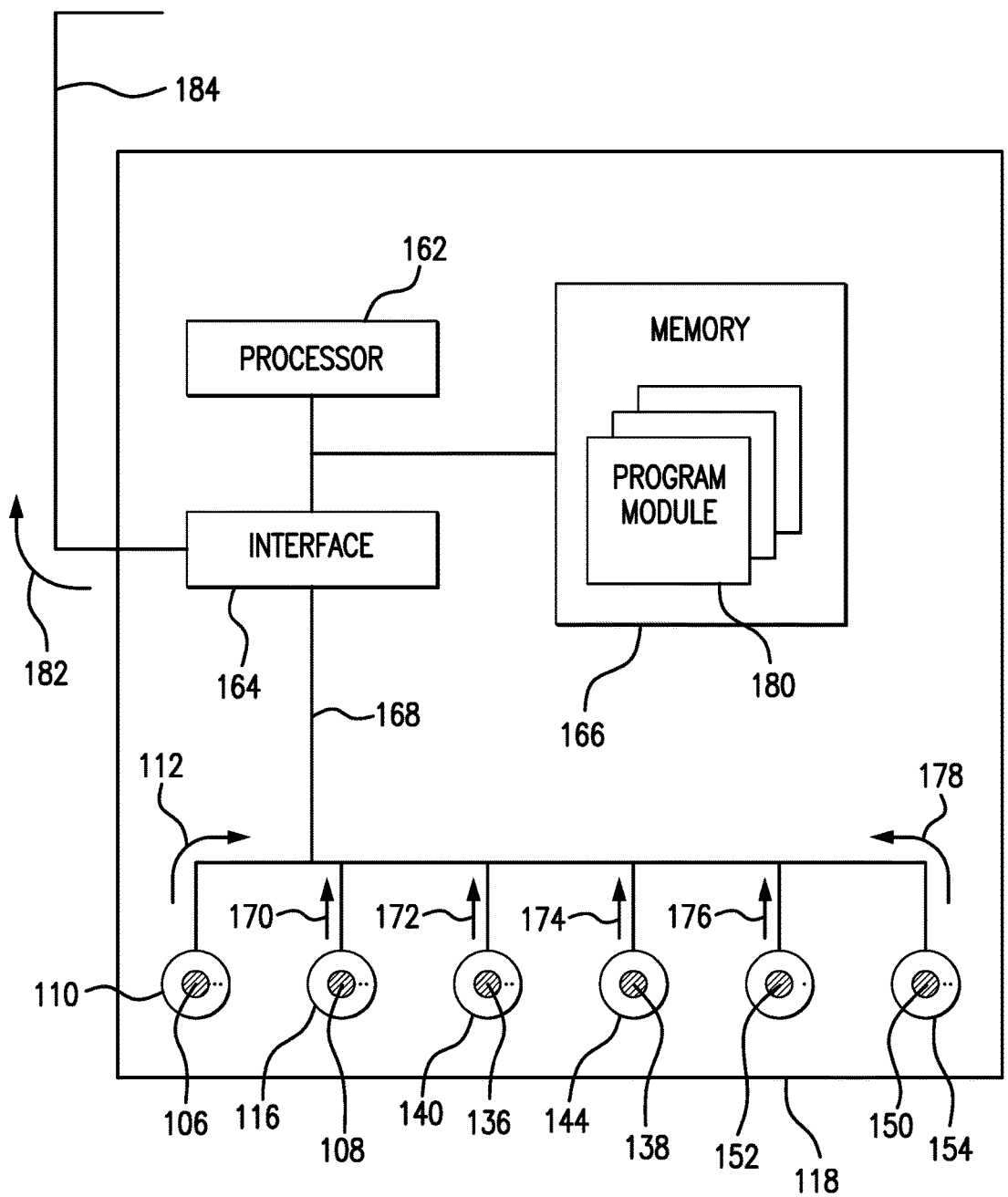
FIG. 3 is a schematic view of the motor controller of FIG. 2, showing current sensors inductively coupled to windings of the electric machine providing signals of current flow through parallel phase windings of the electric machine within the motor controller.

C-phase winding set 130 includes a C-phase first winding 148, a C-phase second winding 150, a C-phase first current sensor 152, and a C-phase second current sensor 154. C-phase second winding 150 is connected in parallel with C-phase first winding 148. C-phase first current sensor 152 is coupled to C-phase first winding 148 and is communicative with motor controller 118 for providing a signal indicative of current 156 flowing through C-phase first winding 148 to motor controller 118. C-phase second current sensor 154 is coupled to C-phase second winding 150 and is communicative with motor controller 118 for providing a signal indicative of current 158 flowing through C-phase second winding 150 to motor controller 118. With reference to FIG. 3, motor controller 118 is shown. Motor controller 118 includes a housing 160, processor 162, an interface 164, a memory 166, and a communications link 168. Each of the parallel phase windings, e.g., A-phase first winding 106, A-phase second winding 108, B-phase first winding 136, B-phase second winding 138, C-phase first winding 148, and C-phase second winding 150, extend from motor 100 (shown in FIG. 1) and into an interior of housing 160, where they electrically connect with respective phase leads, e.g., A-phase lead 202 (shown in FIG. 2), B-phase lead 224 (shown in FIG. 2), and C-phase lead 226 (shown in FIG. 2).

Current sensors inductively couple to each of the parallel windings within in the interior of housing 160 for providing signals indicative of current flow through each winding of the winding sets. In this respect A-phase first current sensor 110 inductively couples to A-phase first winding 106 to and A-phase second current sensor 116 inductively couples to A-phase second winding 108, B-phase first current sensor 140 B-phase first winding 136 and B-phase second current sensor 140 inductively couples to B-phase second winding 138, and C-phase first current sensor 152 inductively couples to C-phase first winding 106 and A-phase second current sensor 116 inductively couples to A-phase second winding 108.

Each of the current sensors provides a signal indicative of current flow through a respective winding to communications link 168. In this respect A-phase first current sensor 110 reports current flow through A-phase first winding 106 via A-phase first winding current signal 112 provided to communications link 168, and A-phase second current sensor 116 reports current flow through A-phase second winding 108 via A-phase second winding current signal 170, which are provided to communications link 168. B-phase first current sensor 140 reports current flow through B-phase first winding 136 via B-phase first winding current signal 172 provided to communications link 168, and B-phase second current sensor 144 reports current flow through B-phase second winding 138 via B-phase second winding current signal 174, which are also provided to communications link 168. C-phase first current sensor 152 reports current flow through C-phase first winding 148 via C-phase first winding current signal 176 provided to communications link 168, and C-phase second current sensor 154 reports current flow through C-phase second winding 150 via C-phase second winding current signal 178, which are additionally provided to communications link 168.

Communications link 168 provides the current signals to processor 162 via interface 164. Processor 162 is disposed in communication with interface 164 and memory 166. Memory 166 has a plurality of program modules 180 recorded thereon that, when read by processor 162, cause processor to execute certain operations, e.g., determine current balance between parallel windings of parallel windings in a phase winding set. In this respect processor receives A-phase first winding current signal 112 and A-phase second winding current signal 170, compares the signal to one another, and determines health of motor 100 (shown in FIG. 2) based on the difference in current flow through the respective windings. This can include comparing the determined difference to a selected balance recorded on memory 166 by way of non-limiting example. Balance can be determined for each of the windings sets within motor 100.

When the comparison indicates that balance between the parallel windings of the winding set is within the selected balance, processor 162 deems the phase healthy. When the comparison indicates that balance between the parallel windings of the winding set is not within the selected balance, processor 162 deems motor 100 unhealthy. A health report, e.g., a balance report 182, can be issued by processor 162 via a communications link 184 to an electrical system manager. Countermeasures can also be taken, such as by shutting down or de-rating motor 100 to reduce current flow through the parallel windings, thereby preventing current imbalance between parallel windings to damage motor 100.

Figure 4:
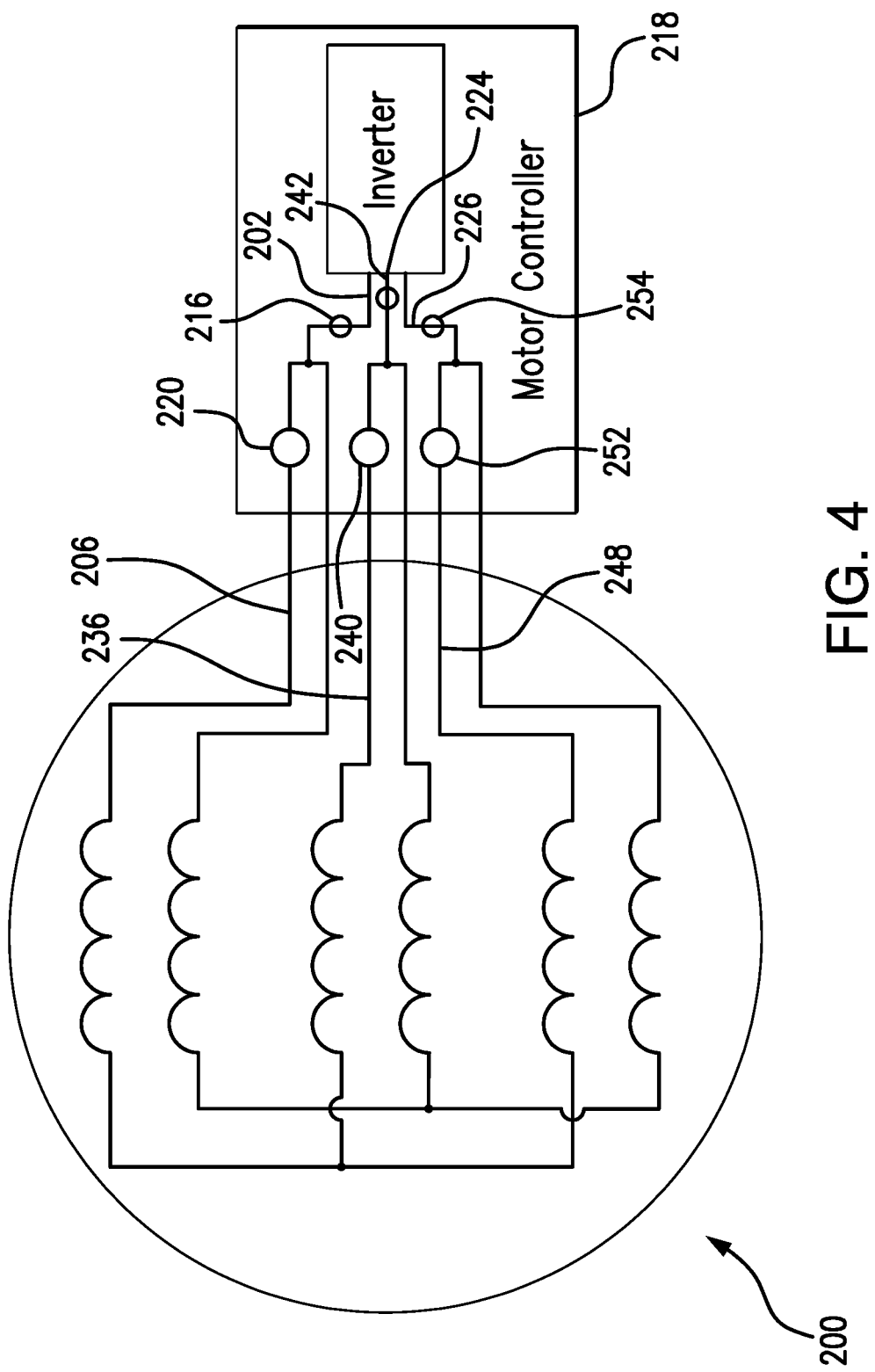
FIG. 4 is a schematic view of another embodiment of the electric machine of FIG. 1, showing current sensors coupled to winding sets and phase sets of the electric machine.

With reference to FIG. 4, a motor 200 is shown. Motor 200 is similar to motor 100 (shown in FIG. 2) and additionally includes phases with a current sensor arranged one of the parallel phase windings and on the phase lead. In this respect motor 200 has an A-phase first current sensor 220 coupled to an A-phase first winding 206 and an A-phase second current sensor 216 coupled to an A-phase lead 202, a B-phase first current sensor 240 coupled to an B-phase first winding 236 and an B-phase second current sensor 242 coupled to an B-phase lead 224, and a C-phase first current sensor 252 coupled to a C-phase first winding 248 and a C-phase second current sensor 254 coupled to a C-phase lead 226. Each of the current sensors are disposed in communication with motor controller 218, which is arranged to determine current balance within the winding sets of motor 200 based on a difference between current sensed at the phase lead and first winding divided by the sensed current flow in the first winding of the respective phase.

Figure 5:
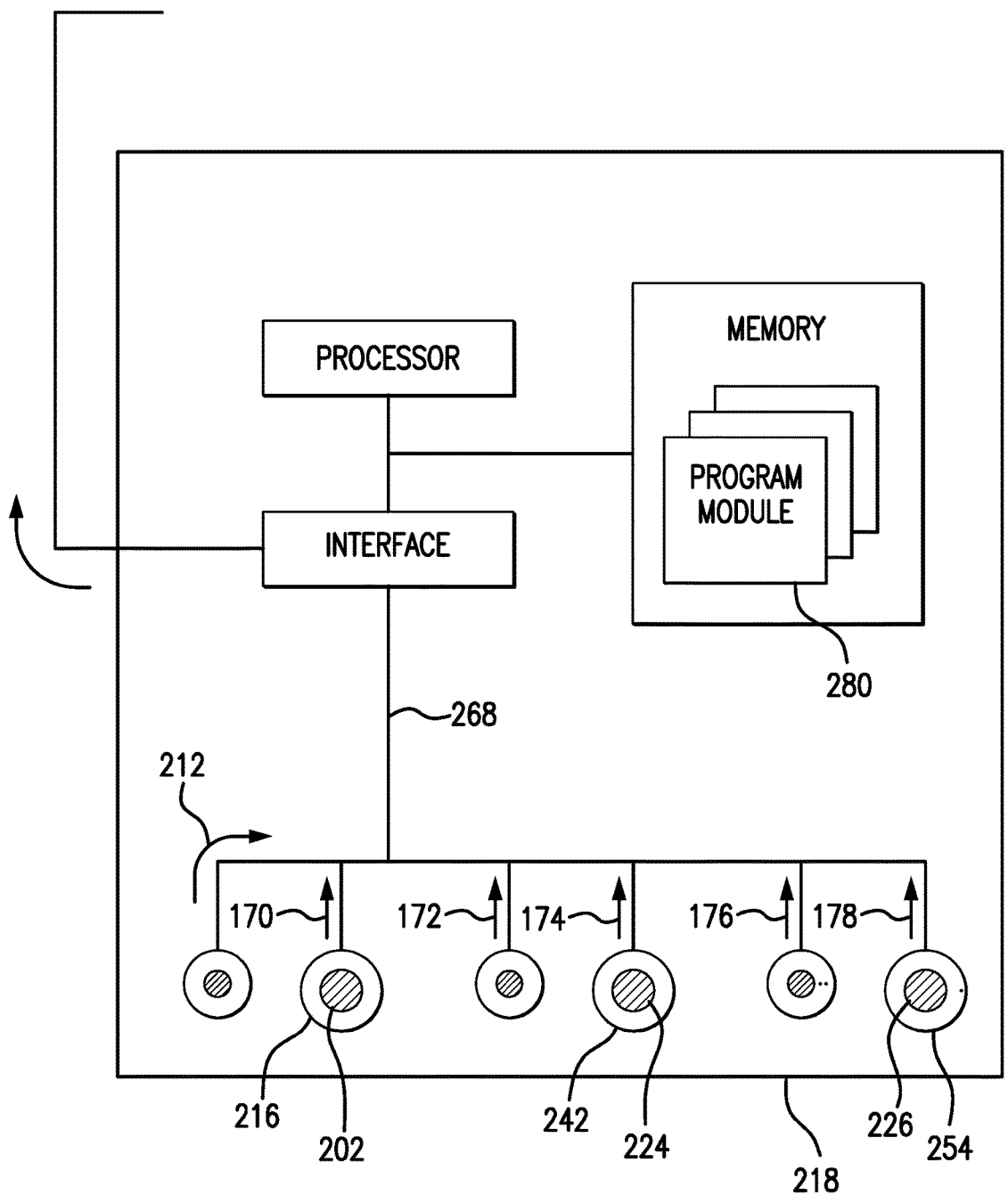
FIG. 5 is a schematic view of the motor controller of FIG. 3, showing current sensors inductively coupled to a phase lead and one of parallel phase windings of the electric machine within the motor controller.

With reference to FIG. 5, motor controller 218 is shown. Motor controller 218 is similar to motor controller 118 (shown in FIG. 2) and additionally includes current sensors connected to phase leads of the windings sets and one of the parallel windings of the winding set. In this respect an A-phase second current sensor 216 is inductively coupled to A-phase phase lead 202 to provide a signal 270 to communications link 168 indicative of current flow through A-phase lead 202, a B-phase second current sensor 242 is inductively coupled to B-phase second winding 238 to provide a signal 274 to communications link 168 indicative of current flow through B-phase lead 224, and a C-phase second current sensor 254 is inductively coupled to C-phase second winding 226 to provide a signal 278 to communications link 168 indicative of current flow through C-phase lead 226.

Program modules 280 have instructions recorded thereon that, when read by processor 262, cause processor 262 to infer current flow through the parallel second windings of the respective winding sets. For example, the instructions can cause processor 262 to subtract the A-phase first winding current signal 212 from an A-phase lead current signal 270, and use the difference between the signal in the above-described balance determination operation based on current balance between the B-phase parallel windings. The instructions can also cause processor 262 to subtract the B-phase first winding current signal 272 from a B-phase lead current signal 274, and use the difference between the signals in the above-described balance determination operation to determine motor health based on current balance between the B-phase parallel windings. Likewise, the instructions can additionally cause processor 262 to subtract the C-phase first winding current signal 276 from a C-phase lead current signal 278, and use the difference between the signals in the above-described balance determination operation to determine motor health based on current balance between the C-phase parallel windings.

Figure 6:
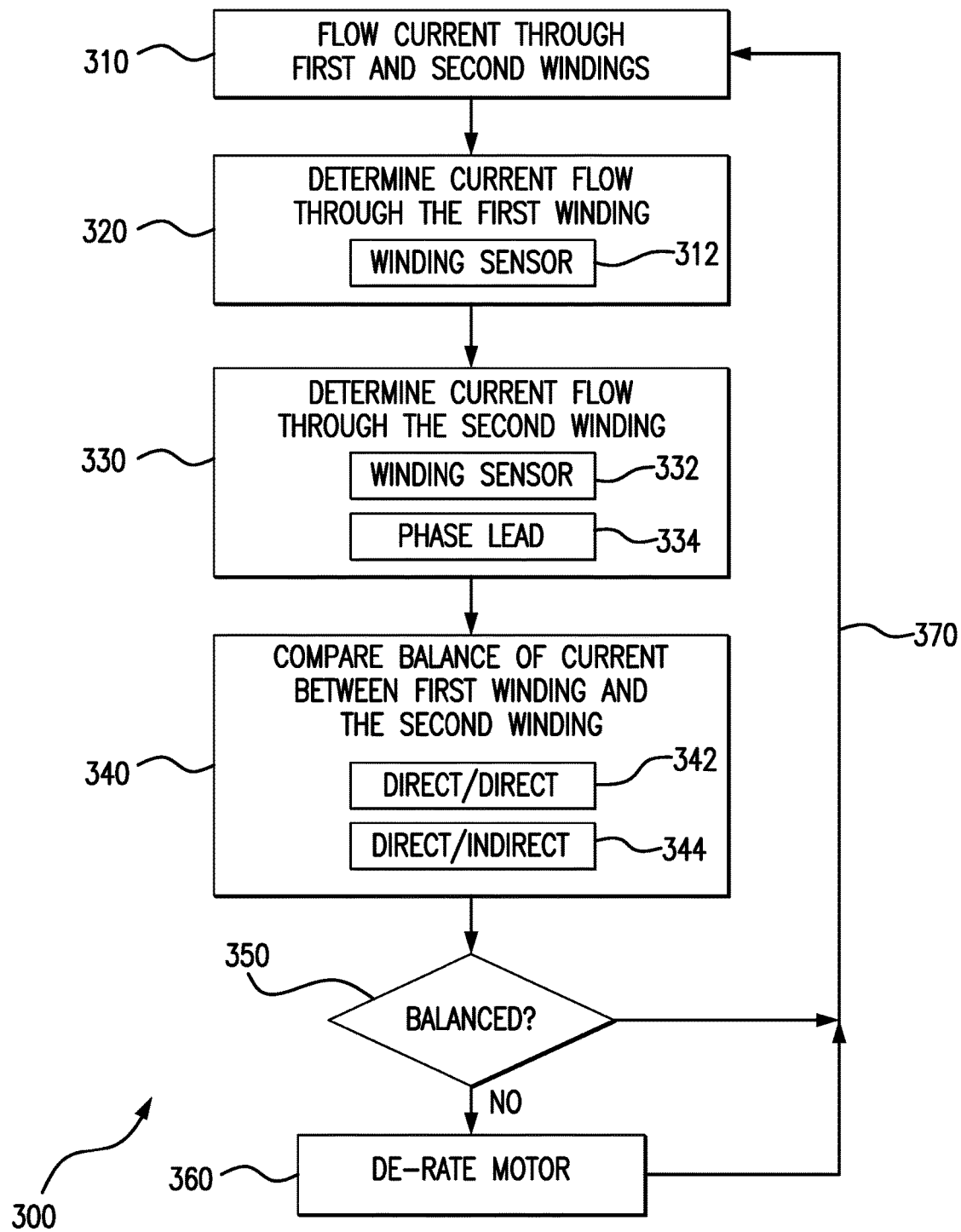
FIG. 6 is process flow chart of a method of sensing current flow in an electric machine, showing steps of the method.

With reference to FIG. 6, a method 300 of monitoring current flow in an electric machine, e.g., motor 100 (shown in FIG. 2), is shown. Method 300 includes flowing current through first and second parallel windings, e.g., A-phase first winding 106 (shown in FIG. 2) and second phase second winding 108 (shown in FIG. 2), in a winding set, as shown with box 310. Current flow through the first winding is sensed using a first current sensor coupled to the first winding, e.g., A-phase first current sensor 110, as shown with box 322, and current flow through the first winding determined using a motor controller, e.g., motor controller 118 (shown in FIG. 2), as shown with box 320.

Method 300 also includes determining current flow through the second winding, e.g., A-phase second winding 108 (shown in FIG. 2), as shown with box 330. Current flow through the second winding can be determined using a signal from a second current sensor coupled to a second winding, e.g., A-phase second current sensor 116 (shown in FIG. 2), as shown with box 332. Current flow through the second winding can be determined using a signal from a second current sensor coupled to an A-phase lead, e.g., A-phase lead 202 (shown in FIG. 3), as shown with box 334.

Health of the electric machine is determined by comparing current flow through the first winding with current flow through the second winding, as shown with box 340. For example, current flow through the A-phase first winding is compared with current flow through the A-phase second winding. The comparison can include direct measurements of current flow through the A-phase first winding and A-phase second winding, such through current sensors electromagnetically directly to each of phase windings of the winding set, as shown with box 342. The comparison can include a direct measurement of current flow through the A-phase first winding and an indirect measurement of current flow through the A-phase second winding, such through an A-phase first current sensor electromagnetically coupled directly to the A-phase first winding and an A-phase second current sensor electromagnetically coupled indirectly to the A-phase second winding, as shown with box 344.

The balance can be compared against a current balance limit, as shown with decision box 350. The balance comparison indicates that current flow in unbalanced the motor is de-rated, as shown with box 360. When the comparison indicates that the balance is within a predetermined balance, monitoring continues, as shown with arrow 370.

For some types of three-phase drive electric motor it is desirable to have two three-phase sets of windings tied in parallel with one another. Reasons for this can include reducing winding resistance and inductance to reduce or minimize electrical losses and/or to improve operation at high electrical frequencies. The winding sets are typically joined in the motor such that a single phase lead exits the motor. The phase leads in turn connect to the power source, which can be a motor controller with an inverter. The motor controller generally senses current flow through the tied windings with current sensors coupled with the phase leads, which measure current in each of the phases as part of a control algorithm that ensures that current is balanced in each of the phases. In the event that one of the windings in the motor exhibits a resistance increase the current across the three phases becomes unbalanced, which the motor controller detects with the current sensors and takes appropriate action, e.g., tripping and stopping operation of the motor.

In some motors resistance change can be such that the current is still sufficiently balanced for the motor controller to continue operating the motor at lower power levels without tripping offline. This occurs because the undamaged leg of the parallel windings accepts additional current, compensating for the damaged parallel winding by shunting current flow to the undamaged leg. This can mask the resistance increase in the damaged phase leg such that the motor controller may not detect the failure. It can also cause the losses in the undamaged path to be higher, potentially reducing the service life of the undamaged winding by the increase current flow.

In embodiments described herein a phase has two current sensors. For example, a current sensor can be coupled to the winding leg and the phase lead. Alternatively, separate current sensors can be coupled to each winding leg. In certain embodiments, current sensors are coupled to each of the winding legs to sense current flow through each of the parallel winding legs. Current sensing in each of the parallel windings prevents a resistance change in one of the parallel windings is not masked by increased current flow through the other of the parallel windings in the winding set. It also allows the motor controller the option to de-rate the motor according to the extent of the resistance change on the winding, such as by providing a "limp mode" where operation with degraded performance is possible without doing further damage to the electric motor.

The methods and systems of the present disclosure, as described above and shown in the drawings, provide for electric machines with superior properties including the capability to detect resistance change in a phase winding that could otherwise lead to current overload in the parallel winding phase winding. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric machine, comprising:
   a phase lead;
   a winding set including first and second windings connected to the phase lead, the second winding connected in parallel with the first winding; and
   a current sensor coupled to the first winding and arranged to measure a portion of current flowing through the phase lead which flows through the first winding,
   wherein the phase lead is an A-phase lead and the winding set is an A-phase winding set, and further comprising:
   a B-phase lead;
   a B-phase winding set including first and second B-phase windings connected to the phase B-phase lead, the second B-phase winding connected in parallel with the first B-phase winding; and
   a B-phase current sensor coupled to the first B-phase winding and arranged to measure a portion of current flowing through the B-phase phase lead which flows through the first B-phase winding.

2. The electric machine as recited in claim 1, wherein the current sensor is a first current sensor, and further comprising a second current sensor coupled to the second winding.

3. The electric machine as recited in claim 1, wherein the current sensor is a first current sensor, and further comprising a second current sensor coupled to the phase lead.

4. The electric machine as recited in claim 1, wherein the B-phase current sensor is a first B-phase current sensor, and further comprising a second B-phase current sensor coupled to the second B-phase winding.

5. The electric machine as recited in claim 1, wherein the B-phase current sensor is a first B-phase current sensor, and further comprising a second B-phase current sensor coupled to the B-phase lead.

6. The electric machine as recited in claim 1, further comprising a motor controller disposed in communication with the current sensor for monitoring current flow through the first and second windings.

7. The electric machine as recited in claim 6, further comprising an inverter electrically connected to the phase lead, the motor controller operably connected to the inverter.

8. The electric machine as recited in claim 1, wherein the phase lead is a motor phase lead.

9. The electric machine as recited in claim 1, wherein the phase lead is a generator phase lead.

10. An electric machine, comprising:
a phase lead;
a winding set including first and second windings connected to the phase lead, the second winding connected in parallel with the first winding; and
a current sensor coupled to the first winding and arranged to measure a portion of current flowing through the phase lead which flows through the first winding, wherein the phase lead is an A-phase lead and the winding set is an A-phase winding set, and further comprising:
a C-phase lead;
a C-phase winding set including first and second C-phase windings connected to the phase C-phase lead, the second C-phase winding connected in parallel with the first C-phase winding; and
a C-phase current sensor coupled to the first C-phase winding and arranged to measure a portion of current flowing through the C-phase phase lead which flows through the first C-phase winding.

11. The electric machine as recited in claim 10, wherein the C-phase current sensor is a first C-phase current sensor, and further comprising a second C-phase current sensor coupled to the second C-phase winding.

12. The electric machine as recited in claim 10, wherein the C-phase current sensor is a first C-phase current sensor, and further comprising a second C-phase current sensor coupled to the C-phase lead.

13. A multiphase electric motor arrangement, comprising:
a multiphase electric motor having a plurality of phases having:
a phase lead;
a winding set including first and second windings connected to the phase lead, the second winding connected in parallel with the first winding; and
a current sensor coupled to the first winding and arranged to measure a portion of current flowing through the phase lead which flows through the first winding; and a motor controller electrically connected to the multiphase electric motor,
wherein the winding set extends between the electric motor and the motor controller,
wherein the motor controller is configured to determine current flow through each winding of the plurality of parallel windings of at least one of the phases.

14. A method operating an electric machine having a parallel winding set, comprising:
flowing current through first and second windings of the parallel winding set;
sensing current flow through the first winding;
determining current flow through the second winding; and
determining health of the electric machine by comparing current flow through the first winding with current flow through the second winding,
wherein determining health of the electric machine further comprises determining whether difference between current flow through the first winding and current flow through the second winding exceeds a selected threshold.

15. The method as recited in claim 14, wherein sensing current flow through the first and second winding includes sensing current flow at the first winding and the second winding.

16. The method as recited in claim 14, further comprising decreasing current flow through at least one of the first winding and the second winding in response to determining the health of the electric machine has been compromised.

17. A method operating an electric machine having a parallel winding set, comprising:
flowing current through first and second windings of the parallel winding set;
sensing current flow through the first winding;
determining current flow through the second winding; and
determining health of the electric machine by comparing current flow through the first winding with current flow through the second winding,
wherein determining current flow through the second winding includes subtracting the sensed current flow through the first winding from current flow sensed at a phase lead connected to the winding set.

18. A method operating an electric machine having a parallel winding set, comprising:
flowing current through first and second windings of the parallel winding set;
sensing current flow through the first winding;
determining current flow through the second winding; and
determining health of the electric machine by comparing current flow through the first winding with current flow through the second winding,
wherein determining current flow through the second winding includes sensing current flow through the first winding.

* * * * *